(12) United States Patent
Sugahara et al.

(10) Patent No.: US 11,080,020 B2
(45) Date of Patent: Aug. 3, 2021

(54) INFORMATION PROCESSING DEVICE AND RANDOM NUMBER GENERATING METHOD

(71) Applicant: MegaChips Corporation, Osaka (JP)

(72) Inventors: Takahiko Sugahara, Osaka (JP); Masayuki Imagawa, Osaka (JP); Hiroki Mizukami, Osaka (JP); Pan Yang, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 16/850,017

(22) Filed: Apr. 16, 2020

(65) Prior Publication Data

US 2020/0341734 A1    Oct. 29, 2020

(30) Foreign Application Priority Data

Apr. 26, 2019 (JP) .............................. JP2019-085022

(51) Int. Cl.
 *G06F 7/58* (2006.01)
(52) U.S. Cl.
 CPC .............. *G06F 7/582* (2013.01); *G06F 7/588* (2013.01)
(58) Field of Classification Search
 CPC ................................................ G06F 7/58–588
 USPC ................................................. 708/250–256
 See application file for complete search history.

(56) References Cited

U.S. PATENT DOCUMENTS

| | | | | |
|---|---|---|---|---|
| 5,778,069 A | * | 7/1998 | Thomlinson | G06F 7/582 380/262 |
| 9,037,624 B1 | * | 5/2015 | Hars | G06F 7/588 708/254 |
| 2003/0061250 A1 | | 3/2003 | Fujita et al. | |
| 2005/0265126 A1 | * | 12/2005 | Izawa | G06F 7/58 368/10 |
| 2015/0006601 A1 | * | 1/2015 | Aissi | H04W 12/0401 708/250 |

FOREIGN PATENT DOCUMENTS

| | | |
|---|---|---|
| JP | 2004-206025 A | 7/2004 |
| JP | 3604674 B2 | 12/2004 |
| JP | 2006-235995 A | 9/2006 |
| JP | 6103958 B2 | 3/2017 |

OTHER PUBLICATIONS

Japanese Office Action dated Jun. 30, 2020 in Japanese Application No. 2019-085022.

* cited by examiner

*Primary Examiner* — Matthew D Sandifer
(74) *Attorney, Agent, or Firm* — Xsensus LLP

(57) ABSTRACT

A memory device includes a memory core that stores data, an access controlling unit that controls an access to the memory core, and a random number generating unit that generates a random number based on an unstable factor related to an access operation to the memory core performed by the access controlling unit.

16 Claims, 6 Drawing Sheets

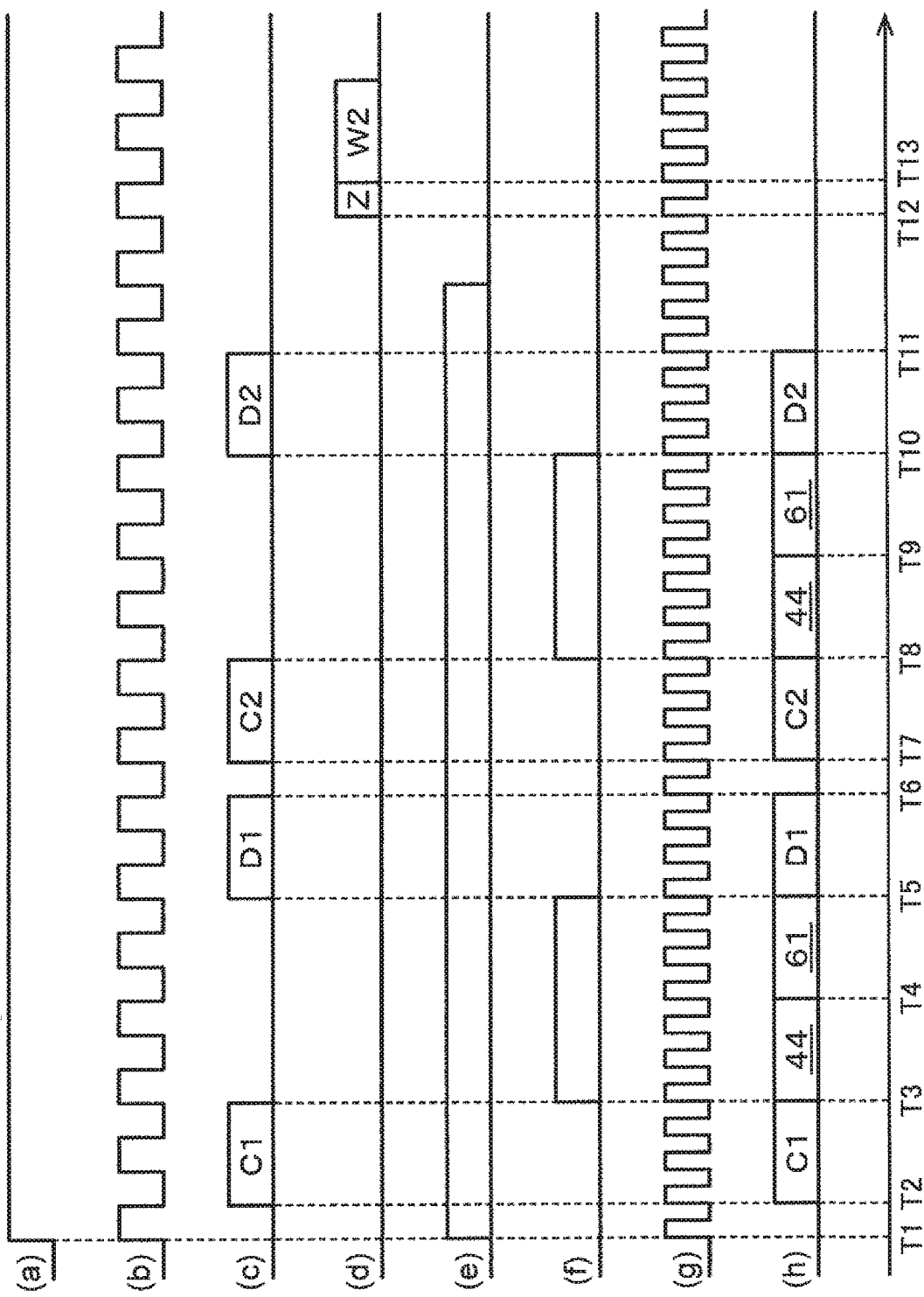

INFORMATION PROCESSING DEVICE AND RANDOM NUMBER GENERATING METHOD

CROSS REFERENCE TO RELATED APPLICATIONS

The present application is based on, and claims priority from Japanese Patent Application Serial Number 2019-085022 filed Apr. 26, 2019, the disclosure of which is hereby incorporated by reference herein in its entirety.

BACKGROUND

Technical Field

The present disclosure relates to an information processing device and a random number generating method.

Related Art

Random numbers are used, for example, for generating keys for cryptographic algorithms. As a method for obtaining a random number close to a true random number, a method of generating a random number using a noise produced in a resistance or a diode has been used. However, in such a method, a low-level noise needs to be amplified by an analogue amplifying circuit which is large in size, and thus the overall size of a random number generating circuit becomes large. Moreover, it is very difficult to design a random number generating circuit using an analogue circuit. To avoid the increase in the size of the circuit and complexity of designing the circuit, use of a digital random number that can be generated by calculation is desired.

A pseudo random number is widely used as a digital random number. The pseudo random number is generated by a predetermined algorithm using a seed (initial value and data) in the random number generating circuit.

JP3604674B2 discloses a random number generating circuit including an indeterminate logic circuit and a uniformizing circuit for uniformizing the occurrence rate of "0" and "1" in a digital value output from the indeterminate logic circuit.

SUMMARY

An information processing device is connected to an external device and includes a circuitry configured to store data in a storage, control an access to the storage by a controller, and generate a random number based on a first unstable factor related to an access operation to the storage performed by the controller and a second unstable factor related to an access operation to the information processing device performed by the external device.

An information processing device is connected to an external device and includes circuitry configured to generate a random number based on a first unstable factor related to an access operation to the external device performed by the information processing device and a second unstable factor related to an internal operation of the external device.

A random number generating method is performed by an information processing device connected to an external device and including circuitry configured to store data in a storage and control an access to the storage by a controller. The random number generating method includes generating a random number based on a first unstable factor related to an access operation to the storage performed by the controller and a second unstable factor related to an access operation to the information processing device performed by the external device.

A random number generating method is performed by an information processing device connected to an external device. The random number generating method includes generating a random number based on a first unstable factor related to an access operation to the external device performed by the information processing device and a second unstable factor related to an internal operation of the external device.

BRIEF DESCRIPTION OF THE DRAWINGS

FIG. 7 is a timing chart illustrating an operation of a memory system according to Embodiment 2.

DETAILED DESCRIPTION

Figure 1:
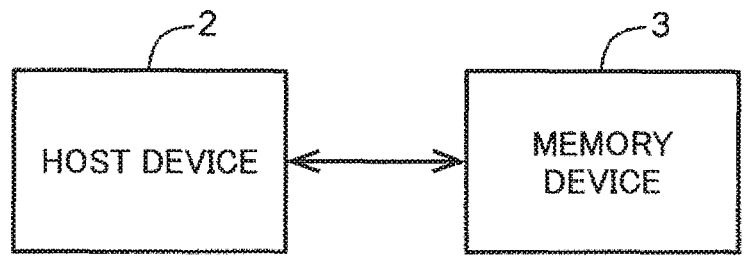
FIG. 1 illustrates a configuration of a memory system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

The term "circuitry" herein may partly or entirely be implemented by using either hardware or software, or both hardware and software.

A pseudo random number is generated by calculation, so that the same pseudo random number is generated from the same initial value and the same algorithm. When a pseudo random number is used for a security application, an attacker can break the security by detecting the initial value and the algorithm. Thus, using a pseudo random number as an authentication code for mutual authentication, for example, deteriorates security robustness.

The present disclosure is directed to obtaining an information processing device and a random number generating method by which a random number having irreproducibility can easily be generated.

An information processing device according to one aspect includes a storage that stores data, a controller that controls an access to the storage, and a random number generating unit that generates a random number based on an unstable factor related to an access operation to the storage performed by the controller. The random number generating unit may comprise suitable logic, circuitry, interfaces, and/or code.

The information processing device according to the aspect generates a random number based on the unstable factor related to the access operation to the storage performed by the controller. Thus, a random number having irreproducibility can easily be generated.

In some embodiments, the random number generating unit generates a random number based on an elapsed time from a completion of receiving a read-data command given by an external device to a start of transmitting data from the information processing device to the external device.

In such an embodiment, the random number generating unit generates a random number based on the elapsed time from the completion of receiving the read-data command given by the external device to the start of transmitting the data from the information processing device to the external device. The random number is generated based on the elapsed time taking various values. Thus, a random number having irreproducibility can easily be generated.

In some embodiments, the information processing device further includes a clock generating unit that generates a clock. The random number generating unit includes a first counter that counts clocks generated by the clock generating unit, and generates a random number based on a counter value of clocks counted by the first counter from the completion of receiving the read-data command given by the external device to the start of transmitting the data from the information processing device to the external device. The clock generating unit may comprise suitable logic, circuitry, interfaces, and/or code.

In such an embodiment, the random number generating unit generates a random number based on the counter value of clocks counted by the first counter from the completion of receiving the read-data command given by the external device to the start of transmitting the data from the information processing device to the external device. The random number is generated based on the counter value taking various values due to variation in a clock cycle. Thus, a random number having irreproducibility can easily be generated.

In some embodiments, the random number generating unit generates a random number based on an elapsed time from a completion of receiving a write-data command given by the external device to a completion of writing data in the storage.

In such an embodiment, the random number generating unit generates a random number based on the elapsed time from the completion of receiving the write-data command given by the external device to the completion of writing the data in the storage. The random number is generated based on the elapsed time taking various values. Thus, a random number having irreproducibility can easily be generated.

In some embodiments, the information processing device further includes a clock generating unit that generates a clock. The random number generating unit includes a second counter that counts clocks generated by the clock generating unit, and generates a random number based on a counter value of clocks counted by the second counter from the completion of receiving the write-data command given by the external device to the completion of writing the data in the storage. The clock generating unit may comprise suitable logic, circuitry, interfaces, and/or code.

In such an embodiment, the random number generating unit generates a random number based on the counter value of clocks counted by the second counter from the completion of receiving the write-data command given by the external device to the completion of writing the data in the storage. The random number is generated based on the counter value taking various values due to variation in a clock cycle. Thus, a random number having irreproducibility can easily be generated.

In some embodiments, the random number generating unit generates a random number based on an elapsed time from a completion of receiving a delete-data command given by the external device to a completion of deleting data stored in the storage.

In such an embodiment, the random number generating unit generates a random number based on the elapsed time from the completion of receiving the delete-data command given by the external device to the completion of deleting the data stored in the storage. The random number is generated based on the elapsed time taking various values. Thus, a random number having irreproducibility can easily be generated.

In some embodiments, the information processing device further includes a clock generating unit that generates a clock. The random number generating unit includes a third counter that counts clocks generated by the clock generating unit, and generates a random number based on a counter value of clocks counted by the third counter from the completion of receiving the delete-data command given by the external device to the completion of deleting the data stored in the storage. The clock generating unit may comprise suitable logic, circuitry, interfaces, and/or code.

In such an embodiment, the random number generating unit generates a random number based on the counter value of clocks counted by the third counter from the completion of receiving the delete-data command given by the external device to the completion of deleting the data in the storage. The random number is generated based on the counter value taking various values due to variation in a clock cycle. Thus, a random number having irreproducibility can easily be generated.

In some embodiments, the random number generating unit generates a random number based on an elapsed time from a start to a completion of reading data from the storage.

In such an embodiment, the random number generating unit generates a random number based on the elapsed time from the start to the completion of reading data from the storage. The random number is generated based on the elapsed time taking various values. Thus, a random number having irreproducibility can easily be generated.

In some embodiments, the information processing device further includes a clock generating unit that generates a clock. The random number generating unit includes a fourth counter that counts clocks generated by the clock generating unit, and generates a random number based on a counter value of clocks counted by the fourth counter from the start to the completion of reading the data from the storage. The clock generating unit may comprise suitable logic, circuitry, interfaces, and/or code.

In such an embodiment, the random number generating unit generates a random number based on the counter value of clocks counted by the fourth counter from the start to the completion of reading the data from the storage. The random number is generated based on the counter value taking various values due to variation in a clock cycle. Thus, a random number having irreproducibility can easily be generated.

In some embodiments, the information processing device further includes an error correcting unit that corrects an error of data read from the storage. The random number generating unit generates a random number based on an elapsed time from a start to a completion of error correction processing performed by the error correcting unit. The error correcting unit may comprise suitable logic, circuitry, interfaces, and/or code.

In such an embodiment, the random number generating unit generates a random number based on the elapsed time from the start to the completion of the error correction processing performed by the error correcting unit. The random number is generated based on the elapsed time taking various values depending on, for example, the number of error corrections. Thus, a random number having irreproducibility can easily be generated.

In some embodiments, the information processing device further includes a clock generating unit that generates a clock. The random number generating unit includes a fifth counter that counts clocks generated by the clock generating unit, and generates a random number based on a counter value of clocks counted by the fifth counter from the start to the completion of the error correction processing performed by the error correcting unit. The clock generating unit may comprise suitable logic, circuitry, interfaces, and/or code.

In such an embodiment, the random number generating unit generates a random number based on the counter value of clocks counted by the fifth counter from the start to the completion of the error correction processing performed by the error correcting unit. The random number is generated based on the counter value taking various values due to variation in a clock cycle. Thus, a random number having irreproducibility can easily be generated.

An information processing device according to another aspect is connected to an external device and includes a random number generating unit that generates a random number based on an unstable factor related to an access operation to the information processing device performed by the external device. The random number generating unit may comprise suitable logic, circuitry, interfaces, and/or code.

The information processing device according to the aspect generates a random number based on the unstable factor related to the access operation to the information processing device performed by the external device. Thus, a random number having irreproducibility can easily be generated.

In some embodiments, the random number generating unit generates a random number based on an elapsed time from a completion of booting the information processing device to a start of receiving a particular command from the external device by the information processing device.

In such an embodiment, the random number generating unit generates a random number based on the elapsed time from the completion of booting the information processing device to the start of receiving a particular command from the external device by the information processing device. The random number is generated based on the elapsed time taking various values. Thus, a random number having irreproducibility can easily be generated.

In some embodiments, the information processing device further includes a clock generating unit that generates a clock. The random number generating unit includes a sixth counter that counts clocks generated by the clock generating unit, and generates a random number based on a counter value of clocks counted by the sixth counter from the completion of booting the information processing device to the start of receiving a particular command from the external device by the information processing device. The clock generating unit may comprise suitable logic, circuitry, interfaces, and/or code.

In such an embodiment, the random number generating unit generates a random number based on the counter value of clocks counted by the sixth counter from the completion of booting the information processing device to the start of receiving the particular command from the external device by the information processing device. The random number is generated based on the counter value taking various values due to variation in a clock cycle. Thus, a random number having irreproducibility can easily be generated.

An information processing device according to another aspect is connected to an external device and includes a random number generating unit that generates a random number based on an unstable factor related to an access operation to the external device performed by the information processing device. The random number generating unit may comprise suitable logic, circuitry, interfaces, and/or code.

The information processing device according to the aspect generates a random number based on the unstable factor related to the access operation to the external device performed by the information processing device. Thus, a random number having irreproducibility can easily be generated.

In some embodiments, the random number generating unit generates a random number based on an elapsed time from the completion of booting the information processing device to a predetermined timing after a completion of the access operation to the external device performed by the information processing device.

In such an embodiment, the random number generating unit generates a random number based on the elapsed time from the completion of booting the information processing device to the predetermined timing after the completion of the access operation to the external device performed by the information processing device. The random number is generated based on the elapsed time taking various values. Thus, a random number having irreproducibility can easily be generated.

In some embodiments, the information processing device further includes a clock generating unit that generates a clock. The random number generating unit includes a first counter that counts clocks generated by the clock generating unit, and generates a random number based on a counter value of clocks counted by the first counter from the completion of booting the information processing device to the predetermined timing after the completion of the access operation to the external device performed by the information processing device. The clock generating unit may comprise suitable logic, circuitry, interfaces, and/or code.

In such an embodiment, the random number generating unit generates a random number based on the counter value of clocks counted by the first counter from the completion of booting the information processing device to the predetermined timing after the completion of the access operation to the external device performed by the information processing device. The random number is generated based on the counter value taking various values due to variation in a clock cycle. Thus, a random number having irreproducibility can easily be generated.

An information processing device according to another aspect is connected to an external device and includes a random number generating unit that generates a random number based on an unstable factor related to an internal operation of the external device. The random number generating unit may comprise suitable logic, circuitry, interfaces, and/or code.

The information processing device according to the aspect generates a random number based on the unstable factor related to the internal operation of the external device. Thus, a random number having irreproducibility can easily be generated.

In some embodiments, the random number generating unit generates a random number based on an elapsed time from a completion of transmitting a request-data command to the external device from the information processing device to a start of receiving data from the external device by the information processing device.

In such an embodiment, the random number generating unit generates a random number based on the elapsed time from the completion of transmitting the request-data command to the external device from the information processing device to the start of receiving the data from the external device by the information processing device. The random number is generated based on the elapsed time taking various values. Thus, a random number having irreproducibility can easily be generated.

In some embodiments, the information processing device further includes a clock generating unit that generates a clock. The random number generating unit includes a second counter that counts clocks generated by the clock generating unit, and generates a random number based on a counter value of clocks counted by the second counter from the completion of transmitting the request-data command to the external device from the information processing device to the start of receiving the data from the external device by the information processing device. The clock generating unit may comprise suitable logic, circuitry, interfaces, and/or code.

In such an embodiment, the random number generating unit generates a random number based on the counter value of clocks counted by the second counter from the completion of transmitting the request-data command to the external device from the information processing device to the start of receiving the data from the external device by the information processing device. The random number is generated based on the counter value taking various values due to variation in a clock cycle. Thus, a random number having irreproducibility can easily be generated.

In some embodiments, the clock generating unit generates a spread spectrum clock as the clock.

In such an embodiment, the clock generating unit generates the spread spectrum clock. By generating the spread spectrum clocks with the clock cycle intentionally varied, a random number having irreproducibility can easily be generated by the random number generating unit.

A program according to another aspect causes a computer mounted in an information processing device including a storage that stores data and a controller that controls an access to the storage to function as a random number generating section, that generates a random number based on an unstable factor related to an access operation to the storage performed by the controller.

The program according to the aspect causes the computer to generate a random number based on the unstable factor related to the access operation to the storage performed by the controller. Thus, a random number having irreproducibility can easily be generated.

A program according to another aspect causes a computer mounted in an information processing device connected to an external device to function as a random number generating section that generates a random number based on an unstable factor related to an access operation to the information processing device performed by the external device.

The program according to the aspect causes the computer to generate a random number based on the unstable factor related to the access operation to the information processing device performed by the external device. Thus, a random number having irreproducibility can easily be generated.

A program according to another aspect causes a computer mounted in an information processing device connected to an external device to function as a random number generating section that generates a random number based on an unstable factor related to an access operation to the external device performed by the information processing device.

The program according to the aspect causes the computer to generate a random number based on the unstable factor related to the access operation to the external device performed by the information processing device. Thus, a random number having irreproducibility can easily be generated.

A program according to another aspect causes a computer mounted in an information processing device connected to an external device to function as a random number generating section that generates a random number based on an unstable factor related to an internal operation of the external device.

The program according to the aspect causes the computer to generate a random number based on the unstable factor related to the internal operation of the external device. Thus, a random number having irreproducibility can easily be generated.

A random number generating method according to another aspect is performed by an information processing device including a storage that stores data, and a controller that controls an access to the storage, and includes generating a random number based on an unstable factor related to an access operation to the storage performed by the controller.

By the random number generating method according to the aspect, a random number is generated based on the unstable factor related to the access operation to the storage performed by the controller. Thus, a random number having irreproducibility can easily be generated.

A random number generating method according to another aspect is performed by an information processing device connected to an external device and includes generating a random number based on an unstable factor related to an access operation to the information processing device performed by the external device.

By the random number generating method according to the aspect, a random number is generated based on the unstable factor related to the access operation to the information processing device performed by the external device. Thus, a random number having irreproducibility can easily be generated.

A random number generating method according to another aspect is performed by an information processing device connected to an external device and includes generating a random number based on an unstable factor related to an access operation to the external device performed by the information processing device.

By the random number generating method according to the aspect, a random number is generated based on the unstable factor related to the access operation to the external device performed by the information processing device. Thus, a random number having irreproducibility can easily be generated.

A random number generating method according to another aspect is performed by an information processing device connected to an external device and includes generating a random number based on an unstable factor related to an internal operation of the external device.

By the random number generating method according to the aspect, a random number is generated based on the unstable factor related to the internal operation of the external device. Thus, a random number having irreproducibility can easily be generated.

According to the present disclosure, a random number having irreproducibility can easily be generated.

These and other objects, features, aspects and advantages of the present disclosure will become more apparent from the following description of embodiments when taken in conjunction with the accompanying drawings.

DESCRIPTION OF EMBODIMENTS

Embodiments of the present disclosure will now be described in detail with reference to the drawings. Among the different drawings, components appended with the same reference sign are the same component or components corresponding to each other.

Embodiment 1

FIG. 1 illustrates a configuration of a memory system 1. As illustrated in FIG. 1, the memory system 1 includes a host device 2, and a memory device 3 detachably connected to the host device 2. For example, the host device 2 is a personal computer and the memory device 3 is a memory card such as a flash memory. The memory device 3 is not necessarily an external memory detachably connected from outside to the host device 2. The memory device 3 may be an internal memory provided in the host device 2.

Described for Embodiment 1 is generation of a random number performed by the memory device 3.

Figure 2:
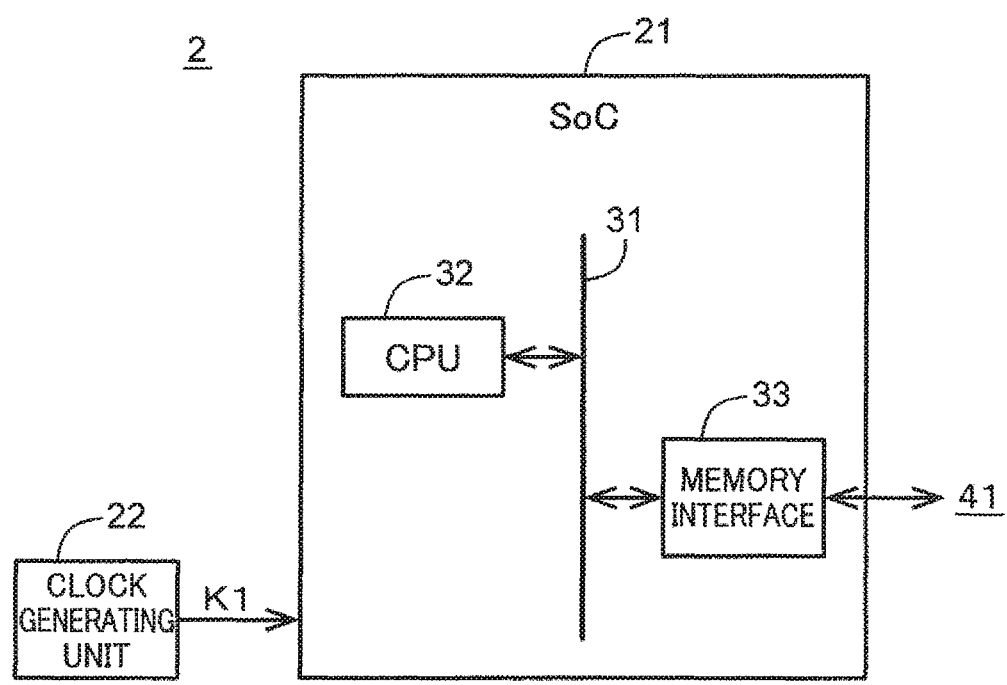
FIG. 2 illustrates, in a simplified manner, a configuration of a host device according to Embodiment 1.

FIG. 2 illustrates, in a simplified manner, a configuration of the host device 2 according to the embodiment. As illustrated in FIG. 2, the host device 2 includes a system-on-chip (SoC) 21, and a clock generating unit 22. The SoC 21 includes a CPU 32 and a memory interface 33 connected to each other via a bus 31. The clock generating unit 22 generates a clock K1 for determining a timing to operate the SoC 21. In the embodiment as an example, the clock generating unit 22 generates, as the clock K1, a spread spectrum clock having a clock cycle slightly varying at random.

Figure 3:
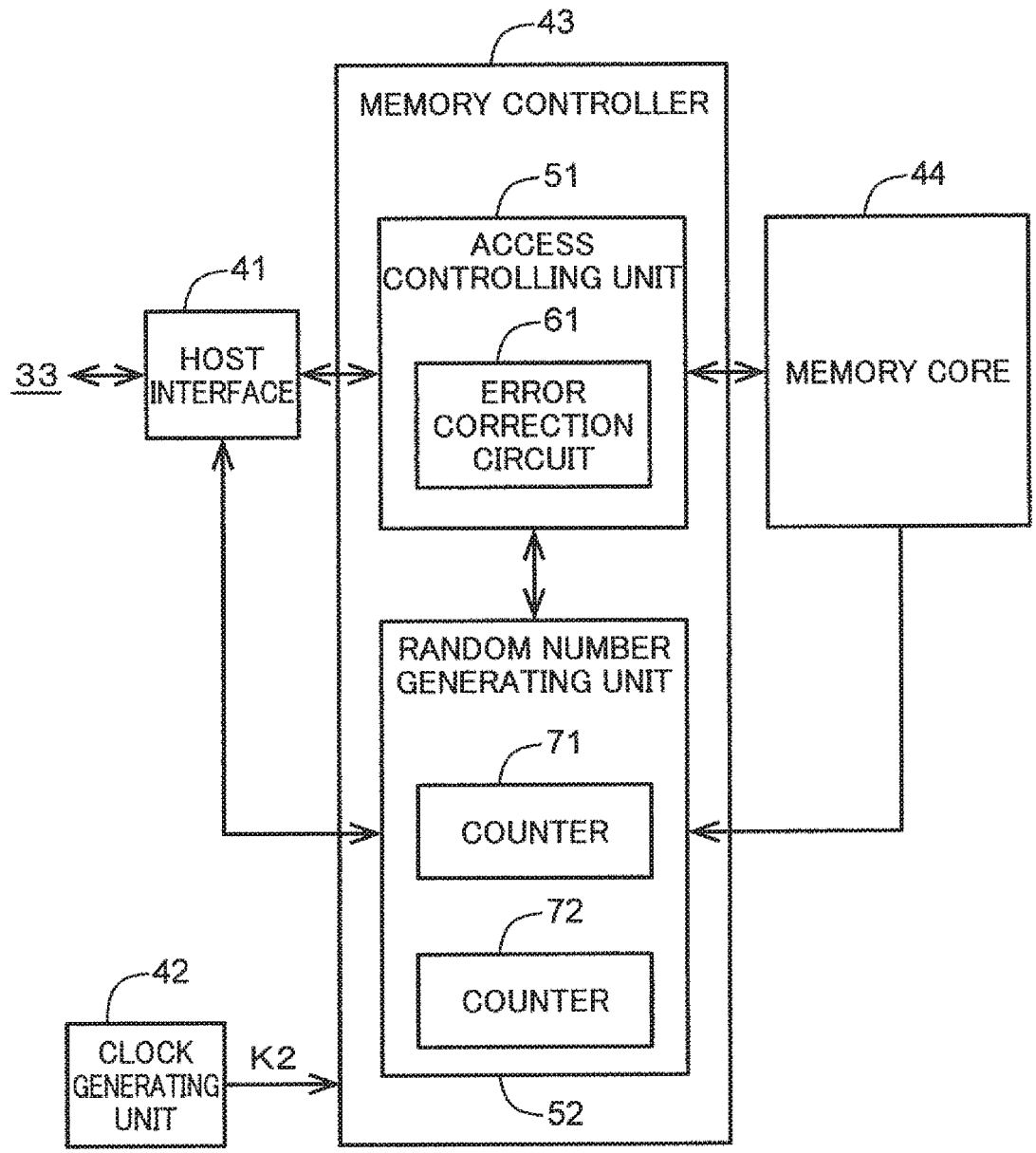
FIG. 3 illustrates, in a simplified manner, a configuration of a memory device according to Embodiment 1.

FIG. 3 illustrates, in a simplified manner, a configuration of the memory device 3 according to the embodiment. As illustrated in FIG. 3, the memory device 3 includes a host interface 41, a clock generating unit 42, a memory controller 43, and a memory core 44. The memory core 44 includes, for example, a NAND flash memory.

The memory controller 43 includes an access controlling unit 51 and a random number generating unit 52. The access controlling unit 51 includes an error correction circuit 61. The random number generating unit 52 includes counters 71 and 72. The access controlling unit 51 and the random number generating unit 52 may be provided as a piece of hardware using, for example, a dedicated circuit or a piece of software using, for example, a CPU. When the random number generating unit 52 is provided as a piece of software, the CPU executes a predetermined program read from a storage medium, such as a ROM, to function as the random number generating unit 52. The clock generating unit 42 generates a clock K2 for determining a timing to operate the memory controller 43. In the embodiment as an example, the clock generating unit 42 generates, as the clock K2, a spread spectrum clock having a clock cycle slightly varying at random. The clock K1 of the host device 2 and the clock K2 of the memory device 3 are not in synchronization with each other.

Figure 4:
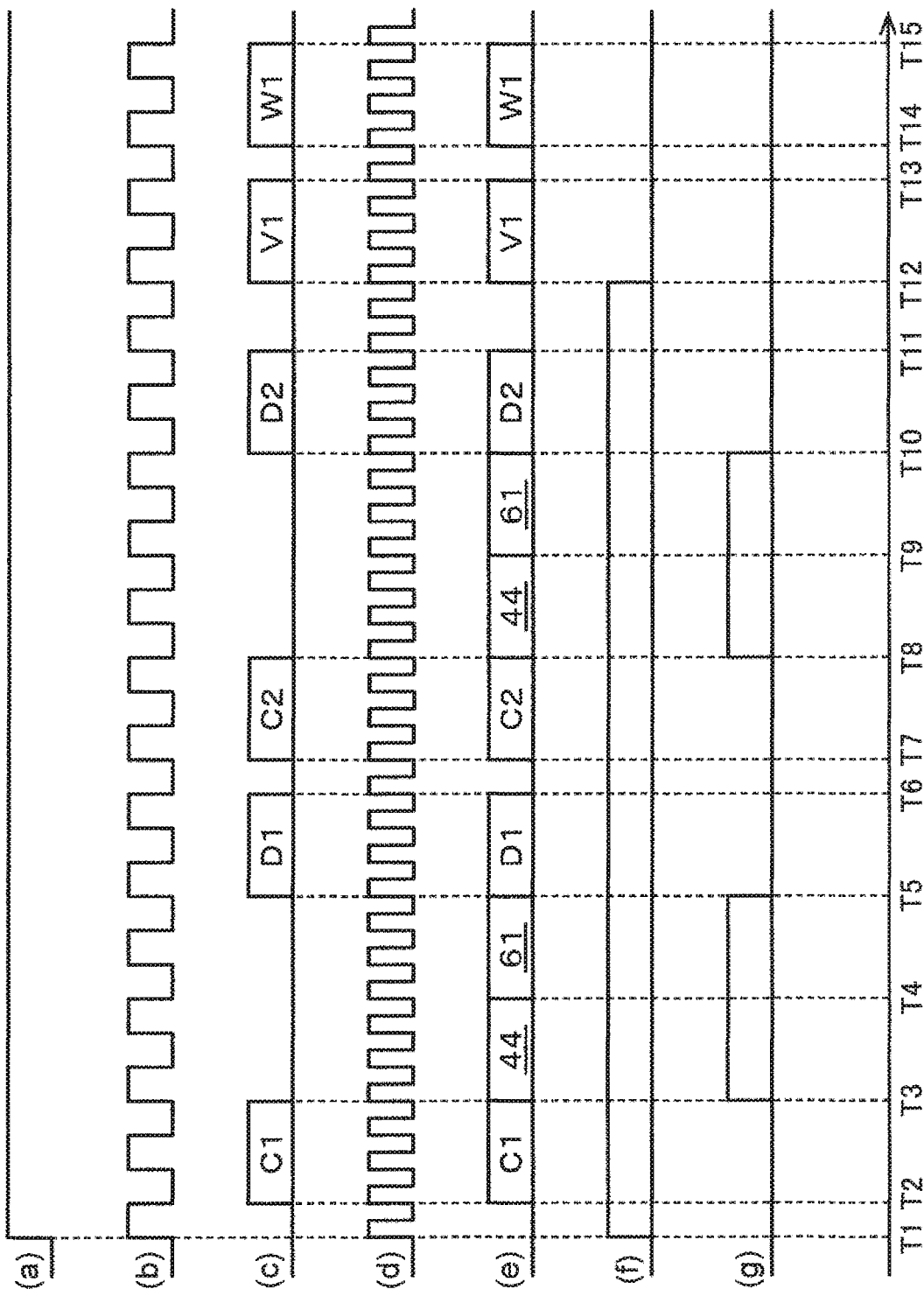
FIG. 4 is a timing chart illustrating an operation of a memory system according to Embodiment 1.

FIG. 4 is a timing chart illustrating an operation of the memory system 1 according to the embodiment. A chart (a) indicates a power source VCC, a chart (b) indicates the clock K1, a chart (c) indicates a command and data that the memory interface 33 transmits or receives, a chart (d) indicates the clock K2, a chart (e) indicates a command and data that the host interface 41 transmits or receives, a chart (f) indicates the counter 71, and a chart (g) indicates the counter 72.

At time T1, booting of the memory system 1 is completed by turning on the power source VCC and the host device 2 and the memory device 3 start operating. The clock generating unit 22 starts supplying the clock K1 to the SoC 21 in the host device 2, and the clock generating unit 42 starts supplying the clock K2 to the memory controller 43 in the memory device 3. The counter 71 starts counting the clock K2 at the time T1.

At time T2, the CPU 32 issues a first read command C1 for reading predetermined data D1 from the memory core 44 and inputs the read command C1 to the memory interface 33. The read command C1 includes a command ID indicating that the read command C1 is a read command, and address information indicating where target data D1 to be read exists. The memory interface 33 transmits to the memory device 3 the read command C1 input by the CPU 32. The host interface 41 inputs the read command C1 received from the host device 2 to the access controlling unit 51.

At time T3, the access controlling unit 51 decodes the read command C1 and accesses the memory core 44 to read the target data D1 from the memory core 44. The counter 72 starts counting the clock K2 at the time T3.

At time T4, the error correction circuit 61 performs predetermined error correction processing on the data D1 read from the memory core 44. The data D1 on which the error correction processing has been performed is input to the host interface 41.

At time T5, the host interface 41 transmits the data D1 on which the error correction processing has been performed to the host device 2. The memory interface 33 inputs the data D1 received from the memory device 3 to the CPU 32. The counter 72 stops counting the clock K2 at the time T5 and holds the counter value at that timing.

The time period from the time T3 when the host device 2 completes transmitting the read command C1 to the time T5 when the host device 2 starts receiving the data D1 from the memory device 3 is a latency period in which the host device 2 waits for the data D1 from the memory device 3. In the latency period, the memory controller 43 continues transmitting a BUSY signal to the host device 2 and transmits a READY signal to the host device 2 immediately before the end of the latency period.

At time T6, the memory interface 33 completes receiving the data D1 from the memory device 3.

At time T7, the CPU 32 issues a second read command C2 and inputs the read command C2 to the memory interface 33. The memory interface 33 transmits to the memory device 3 the read command C2 input by the CPU 32. The host interface 41 inputs to the access controlling unit 51 the read command C2 received from the host device 2.

At time T8, the access controlling unit 51 decodes the read command C2 and accesses the memory core 44 to read target data D2 to be read from the memory core 44. The counter 72 restarts counting the clock K2 at the time T8, continuing from the counter value held at that timing.

At time T9, the error correction circuit 61 performs the predetermined error correction processing on the data D2 read from the memory core 44. The data D2 on which the error correction processing has been performed is input to the host interface 41.

At time T10, the host interface 41 transmits to the host device 2 the data D2 on which the error correction processing has been performed. The memory interface 33 inputs to the CPU 32 the data D2 received from the memory device 3. The counter 72 stops counting the clock K2 at the time T10 and holds the counter value at that timing.

Like the time period from the time T3 to the time T5, the time period from the time T8 to the time T10 is a latency period. In the latency period, the memory controller 43 continues transmitting the BUSY signal to the host device 2 and transmits the READY signal to the host device 2 immediately before the end of the latency period.

At time T11, the memory interface 33 completes receiving the data D2 from the memory device 3.

At time T12, the CPU 32 issues a random number request command V1 for requesting the memory device 3 to generate a random number W1 and inputs the random number request command V1 to the memory interface 33. The memory interface 33 transmits to the memory device 3 the random number request command V1 input by the CPU 32. The host interface 41 inputs to the access controlling unit 51 the random number request command V1 received from the host device 2. The counter 71 stops counting the clock K2 at the time T12 and holds the counter value at that timing.

At time T13, the host interface 41 completes receiving the random number request command V1 from the host device 2.

At time T14, the access controlling unit 51 decodes the random number request command V1 and inputs a random number generation command to the random number generating unit 52. Based on the counter values of the counter 71 and the counter 72 at that timing, the random number generating unit 52 generates the random number W1. As a first example, the random number generating unit 52 arranges the counter values of the counter 71 and the counter 72 to generate the random number W1. For example, by arranging the counter value of the counter 71 in a higher-order bit and the counter value of the counter 72 in a lower-order bit, the random number W1 having a bit width wider than the bit width of each of the counter values is generated. As a second example, the random number generating unit 52 synthesizes the counter values of the counter 71 and the counter 72 by an exclusive OR, for example, to generate the random number W1. As a third example, the random number generating unit 52 generates the random number W1 having unpredictability through any hash-generating algorithm such as Secure Hash Algorithm 1 (SHA-1) and Secure Hash Algorithm 2 (SHA-2) or any cryptographic algorithm such as Advanced Encryption Standard (AES) using the counter values of the counters 71 and 72 as seeds. The third example may be used in combination with the first example or the second example. The random number generating unit 52 transmits the generated random number W1 to the host device 2 via the host interface 41.

Like the time period from the time T3 to the time T5, the time period from the time T13 to the time T14 is a latency period. In the latency period, the memory controller 43 continues transmitting the BUSY signal to the host device 2 and transmits the READY signal to the host device 2 immediately before the end of the latency period.

At time T15, the memory interface 33 completes receiving the random number W1 from the memory device 3. The memory interface 33 inputs to the CPU 32 the random number W1 received from the memory device 3.

In the memory device 3 (information processing device) according to the embodiment, the random number generating unit 52 generates the random number W1 based on the unstable factor related to the access operation to the memory core 44 (storage) performed by the access controlling unit 51 (controller). Thus, the random number W1 having irreproducibility can easily be generated.

In the memory device 3 according to the embodiment, the random number generating unit 52 generates the random number W1 based on an unstable factor, which is an elapsed time from the timing (T3, T8) of completion of receiving the read command C (C1, C2) from the host device 2 (external device) to the timing (T5, T10) of start of transmitting the data D (D1, D2) from the memory device 3 to the host device 2. The random number W1 is generated based on the elapsed time taking various values. Thus, the random number W1 having irreproducibility can easily be generated.

In the memory device 3 according to the embodiment, the random number generating unit 52 generates the random number W1 based on a counter value of the clock K2 counted by the counter 72 (first counter) from the timing (T3, T8) of completion of receiving the read command C (C1, C2) from the host device 2 (external device) to the timing (T5, T10) of start of transmitting the data D (D1, D2) from the memory device 3 to the host device 2. The clock cycle of the clock K2 varies due to an ambient environment such as temperature and a voltage of a power source. The counter value of the counter 72 varies due to variation in the clock cycle of the clock K2. The random number W1 is generated based on the counter value. Thus, the random number W1 having irreproducibility can easily be generated.

In the memory device 3 according to the embodiment, the random number generating unit 52 generates the random number W1 based on an unstable factor related to an access operation to the memory device 3 performed by the host device 2. Thus, the random number W1 having irreproducibility can easily be generated.

In the memory device 3 according to the embodiment, the random number generating unit 52 generates the random number W1 based on an unstable factor, which is an elapsed time from the timing (T1) of completion of booting the memory device 3 to the timing (T12) of start of receiving the random number request command V1 from the host device 2 by the memory device 3. The elapsed time varies due to factors such as the number of times the read commands C1 and C2 are issued and an interval of issuing of the read commands C1 and C2. The random number W1 is generated based on the elapsed time. Thus, the random number W1 having irreproducibility can easily be generated.

In the memory device 3 according to the embodiment, the random number generating unit 52 generates the random number W1 based on a counter value of the clock K2 counted by the counter 71 (sixth counter) from the timing (T1) of completion of booting the memory device 3 to the timing (T12) of start of the memory device 3 receiving the random number request command V1 from the host device 2. The clock cycle of the clock K2 varies due to an ambient environment such as temperature and a voltage of a power source. The counter value of the counter 71 varies due to variation in the clock cycle of the clock K2. The random number W1 is generated based on the counter value. Thus, the random number W1 having irreproducibility can easily be generated.

In the memory device 3 according to the embodiment, the clock generating unit 42 generates a spread spectrum clock as the clock K2. With this configuration, the clock cycle of the clock K2 can intentionally be varied. Thus, a random number W1 having irreproducibility can easily be generated by the random number generating unit 52.

Various exemplary modifications of Embodiment 1 will now be described. The exemplary modifications can arbitrarily be used in combination.

Exemplary Modification 1-1

In Embodiment 1, the random number generating unit 52 generates the random number W1 based on the time necessary for the processing of reading the data D from the memory core 44. However, the random number W1 may be generated based on a time necessary for processing of writing the data D in the memory core 44.

The host device 2 transmits to the memory device 3 a write command for writing the data D. The random number generating unit 52 generates the random number W1 based on an elapsed time from a completion of receiving a write command given by the host device 2 to a completion of the processing of writing the data D in a designated address in the memory core 44.

Specifically, the random number generating unit 52 generates the random number W1 based on a counter value of the clock K2 counted by the counter 72 (second counter) from the timing of completion of receiving the write command given by the host device 2 to the timing of completion of the processing of writing the data D in the designated address in the memory core 44.

According to the exemplary modification, the random number generating unit 52 generates the random number W1 based on the elapsed time from the completion of receiving the write command given by the host device 2 to the completion of the processing of writing the data D in the memory core 44. The random number W1 is generated based on the elapsed time taking various values. Thus, the random number W1 having irreproducibility can easily be generated.

Furthermore, in the exemplary modification, the random number generating unit 52 generates the random number W1 based on the counter value of the clock K2 counted by the counter 72 from the timing of completion of receiving the write command given by the host device 2 to the timing of completion of the processing of writing the data D in the memory core 44. The random number W1 is generated based on the counter value taking various values due to variation in the clock cycle of the clock K2. Thus, the random number W1 having irreproducibility can easily be generated.

Exemplary Modification 1-2

In Embodiment 1, the random number generating unit 52 generates the random number W1 based on the time necessary for the processing of reading the data D from the memory core 44. However, the random number W1 may be generated based on a time necessary for processing of deleting the particular data D stored in the memory core 44.

The host device 2 transmits to the memory device 3 a delete command for deleting the data D. The random number generating unit 52 generates the random number W1 based on an elapsed time from a completion of receiving the delete command given by the host device 2 to a completion of the processing of deleting the data D in the memory core 44.

Specifically, the random number generating unit 52 generates the random number W1 based on a counter value of the clock K2 counted by the counter 72 (third counter) from the timing of completion of receiving the delete command given by the host device 2 to the timing of completion of the processing of deleting the data D in the memory core 44.

According to the exemplary modification, the random number generating unit 52 generates the random number W1 based on the elapsed time from the completion of receiving the delete command given by the host device 2 to the completion of the processing of deleting the data D in the memory core 44. The random number W1 is generated based on the elapsed time taking various values. Thus, the random number W1 having irreproducibility can easily be generated.

Furthermore, in the exemplary modification, the random number generating unit 52 generates the random number W1 based on a counter value of the clock K2 counted by the counter 72 from the timing of completion of receiving the delete command given by the host device 2 to the timing of completion of the processing of deleting the data D in the memory core 44. The random number W1 is generated based on the counter value taking various values due to variation in the clock cycle of the clock K2. Thus, the random number W1 having irreproducibility can easily be generated.

Exemplary Modification 1-3

In Embodiment 1, the random number generating unit 52 generates the random number W1 based on the elapsed time from the completion of receiving the read command C to the start of transmitting the data D. However, the random number W1 may be generated only based on a time necessary for accessing the memory core 44.

The random number generating unit 52 generates the random number W1 based on an elapsed time from a start to a completion of reading the data D from the memory core 44.

Specifically, the random number generating unit 52 generates the random number W1 based on a counter value of the clock K2 counted by the counter 72 (fourth counter) from the timing (T3, T8) of start of reading the data D (D1, D2) from a memory array 44 to the timing (T4, T9) of completion of reading the data D (D1, D2) from the memory array 44.

According to the exemplary modification, the random number generating unit 52 generates the random number W1 based on the elapsed time from the start to the completion of reading the data D from the memory array 44. The random number W1 is generated based on the elapsed time taking various values. Thus, the random number W1 having irreproducibility can easily be generated.

Furthermore, according to the exemplary modification, the random number generating unit 52 generates the random number W1 based on a counter value of the clock K2 counted by the counter 72 from the start to the completion of reading the data D from the memory array 44. The random number W1 is generated based on the counter value taking various values due to variation in the clock cycle of the clock K2. Thus, the random number W1 having irreproducibility can easily be generated.

Exemplary Modification 1-4

In Embodiment 1, the random number generating unit 52 generates the random number W1 based on the elapsed time from the completion of receiving the read command C to the start of transmitting the data D. However, the random number W1 may be generated only based on the time necessary for error correction processing.

The random number generating unit 52 generates the random number W1 based on an elapsed time from a start to a completion of the error correction processing performed on the data D by the error correction circuit 61.

Specifically, the random number generating unit 52 generates the random number W1 based on a counter value of the clock K2 counted by the counter 72 (fifth counter) from the timing (T4, T9) of start of the error correction processing performed on the data D (D1, D2) by the error correction circuit 61 to the timing (T5, T10) of completion of the error correction processing performed by the error correction circuit 61.

According to the exemplary modification, the random number generating unit 52 generates the random number W1 based on the elapsed time from the start of the error correction processing performed on the data D by the error correction circuit 61 (error correcting unit) to the completion of the error correction processing. The random number W1 is generated based on the elapsed time taking various values depending on, for example, the number of error corrections. Thus, the random number W1 having irreproducibility can easily be generated.

Furthermore, according to the exemplary modification, the random number generating unit 52 generates the random number W1 based on a counter value of the clock K2 counted by the counter 72 from the start to the completion of the error correction processing performed on the data D by the error correction circuit 61. The random number W1 is generated based on the counter value taking various values due to variation in the clock cycle of the clock K2. Thus, the random number W1 having irreproducibility can easily be generated.

Embodiment 2

Described for Embodiment 2 is generation of a random number performed by the host device 2. Description will be made mainly on a difference from Embodiment 1.

Figure 5:
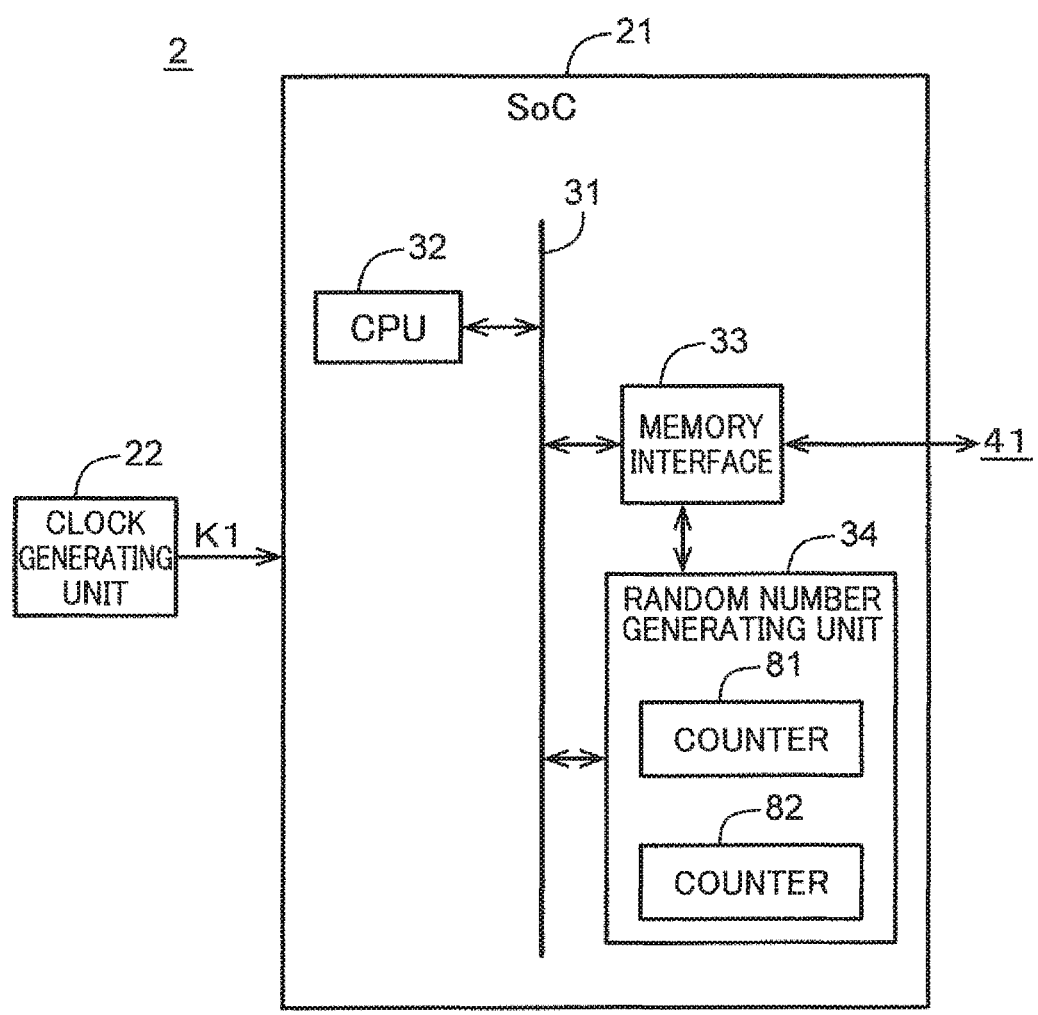
FIG. 5 illustrates, in a simplified manner, a configuration of a host device according to Embodiment 2.

FIG. 5 illustrates, in a simplified manner, a configuration of the host device 2 according to the embodiment. As illustrated in FIG. 5, the host device 2 includes the SoC 21 and the clock generating unit 22. The SoC 21 includes the CPU 32, the memory interface 33, and a random number generating unit 34 connected to each other via the bus 31. The random number generating unit 34 includes counters 81 and 82. The random number generating unit 34 may be provided as a piece of hardware using, for example, a dedicated circuit or a piece of software using, for example, the CPU 32 (or a different CPU). When the random number generating unit 34 is provided as a piece of software, the CPU 32 executes a predetermined program read from a storage medium, such as a ROM, to function as the random number generating unit 34.

Figure 6:
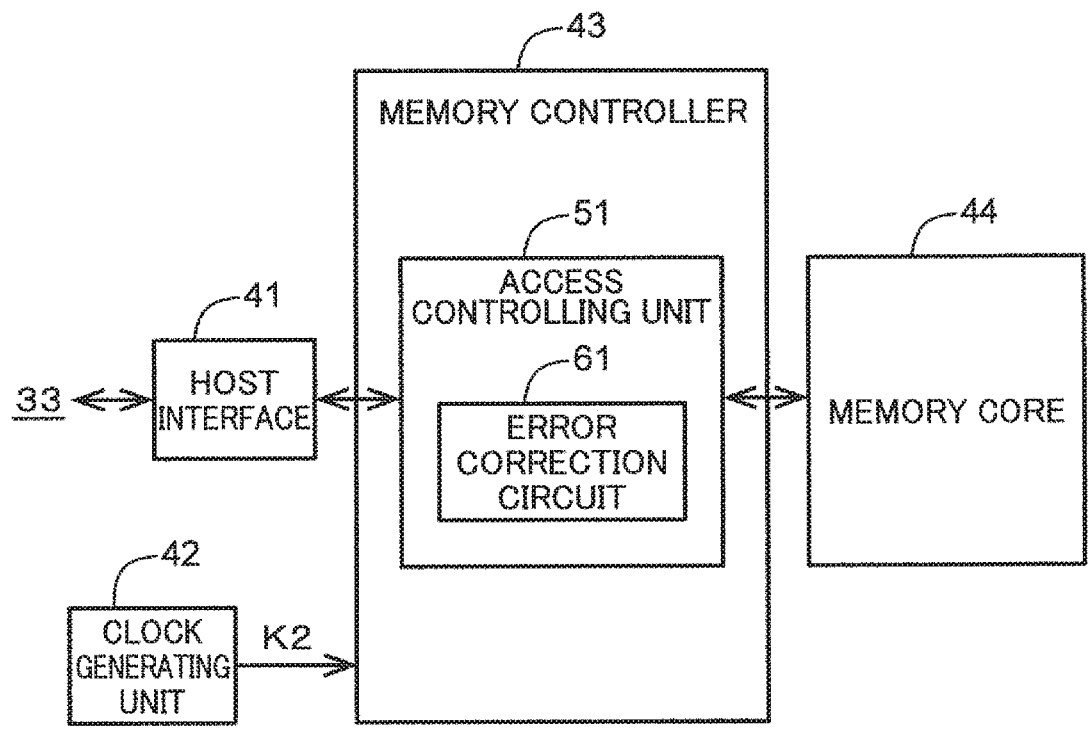
FIG. 6 illustrates, in a simplified manner, a configuration of a memory device according to Embodiment 2.

FIG. 6 illustrates, in a simplified manner, a configuration of the memory device 3 according to the embodiment. As illustrated in FIG. 6, the memory device 3 includes the host interface 41, the clock generating unit 42, the memory controller 43, and the memory core 44. The memory controller 43 includes the access controlling unit 51, and the access controlling unit 51 includes the error correction circuit 61.

FIG. 7 is a timing chart illustrating an operation of the memory system 1 according to the embodiment. A chart (a) indicates a power source VCC, a chart (b) indicates a clock K1, a chart (c) indicates a command and data that the memory interface 33 transmits or receives, a chart (d) indicates a command and a random number input to or output from the random number generating unit 34, a chart (e) indicates the counter 81, a chart (0 indicates the counter 82, a chart (g) indicates a clock K2, and a chart (h) indicates a command and data that the host interface 41 transmits or receives.

At time T1, booting of the memory system 1 is completed by turning on the power source VCC and the host device 2 and the memory device 3 start operating. The clock generating unit 22 starts supplying the clock K1 to the SoC 21 in the host device 2, and the clock generating unit 42 starts supplying the clock K2 to the memory controller 43 in the memory device 3. The counter 81 starts counting the clock K1 at the time T1.

At time T2, the CPU 32 issues a first read command C1 for reading predetermined data D1 from the memory core 44 and inputs the read command C1 to the memory interface 33. The memory interface 33 transmits to the memory device 3 the read command C1 input by the CPU 32.

At time T3, the memory interface 33 completes transmitting the read command C1 to the memory device 3. The counter 82 starts counting the clock K1 at the time T3. The host interface 41 inputs the read command C1 received from the host device 2 to the access controlling unit 51. The access controlling unit 51 decodes the read command C1 and accesses the memory core 44 to read the target data D1 to be read from the memory core 44.

At time T4, the error correction circuit 61 performs predetermined error correction processing on the data D1 read from the memory core 44. The data D1 on which the error correction processing has been performed is input to the host interface 41.

At time T5, the host interface 41 transmits the data D1 on which the error correction processing has been performed to the host device 2. The memory interface 33 inputs the data D1 received from the memory device 3 to the CPU 32. The counter 82 stops counting the clock K1 at the time T5 and holds the counter value at that timing. That is, the counter 82 counts the clock K1 in a period (from time T3 to time T5) when the host device 2 receives a BUSY signal and a READY signal from the memory device 3.

At time T6, the memory interface 33 completes receiving the data D1 from the memory device 3.

At time T7, the CPU 32 issues a second read command C2 and inputs the read command C2 to the memory interface 33. The memory interface 33 transmits to the memory device 3 the read command C2 input by the CPU 32.

At time T8, the memory interface 33 completes transmitting the read command C2 to the memory device 3. The counter 82 restarts counting the clock K1 at the time T8, continuing from the counter value held at that timing. The host interface 41 inputs to the access controlling unit 51 the read command C2 received from the host device 2. The access controlling unit 51 decodes the read command C2 and accesses the memory core 44 to read target data D2 to be read from the memory core 44.

At time T9, the error correction circuit 61 performs the predetermined error correction processing on the data D2 read from the memory core 44. The data D2 on which the error correction processing has been performed is input to the host interface 41.

At time T10, the host interface 41 transmits to the host device 2 the data D2 on which the error correction processing has been performed. The memory interface 33 inputs to the CPU 32 the data D2 received from the memory device 3. The counter 82 stops counting the clock K1 at the time T10 and holds the counter value at that timing.

At time T11, the memory interface 33 completes receiving the data D2 from the memory device 3.

At time T12, the CPU 32 inputs a stop-counting command Z to the random number generating unit 34. The counter 81 stops counting the clock K1 at the time T12 and holds the counter value at that timing. The CPU 32 may issue the stop-counting command Z at any timing later than the completion of receiving the data D2 by the memory device 3. As an example, the stop-counting command Z may be issued at the same timing as the timing of start of a procedure of reading a boot code from the memory device 3 for initializing the host device 2. In another example, the stop-counting command Z may be issued at a timing immediately after the completion of calibration processing for establishing communication between the host device 2 and the memory device 3.

At time T13, the random number generating unit 34 generates a random number W2 based on the counter values of the counter 81 and the counter 82 at that timing. As a first example, the random number generating unit 34 arranges the counter values of the counter 81 and the counter 82 to generate the random number W2. For example, by arranging the counter value of the counter 81 in a higher-order bit and the counter value of the counter 82 in a lower-order bit, the random number W2 having a bit width wider than the bit width of each of the counter values is generated. As a second example, the random number generating unit 34 synthesizes the counter values of the counter 81 and the counter 82 by an exclusive OR, for example, to generate the random number W2. As a third example, the random number generating unit 34 generates the random number W2 having unpredictability through any hash-generating algorithm such as SHA-1 and SHA-2 or any cryptographic algorithm such as AES using the counter values of the counters 81 and 82 as seeds. The third example may be used in combination with the first example or the second example.

In the host device 2 (information processing device) according to the embodiment, the random number generating unit 34 generates the random number W2 based on the unstable factor related to the access operation to the memory device 3 (external device) performed by the host device 2. Thus, the random number W2 having irreproducibility can easily be generated.

In the host device 2 according to the embodiment, the random number generating unit 34 generates the random number W2 based on the unstable factor, which is the elapsed time from the completion of booting the host device 2 to the predetermined timing (timing of issuing the stop-counting command Z) after the completion of the access operation to the memory device 3 performed by the host device 2. The elapsed time varies due to factors such as the number of times the read commands C1 and C2 are issued and an interval of issuing of the read commands C1 and C2. The random number W2 is generated based on the elapsed time. Thus, the random number W2 having irreproducibility can easily be generated.

In the host device 2 according to the embodiment, the random number generating unit 34 generates the random number W2 based on the counter value of the clock K1 counted by the counter 81 (first counter) from the completion of booting the host device 2 to the predetermined timing after the completion of the access operation to the memory device 3 performed by the host device 2. The clock cycle of the clock K1 varies due to an ambient environment such as temperature and a voltage of a power source. The counter value of the counter 81 varies due to variation in the clock cycle of the clock K1. The random number W2 is generated based on the counter value. Thus, the random number W2 having irreproducibility can easily be generated.

Furthermore, in the host device 2 according to the embodiment, the random number generating unit 34 generates the random number W2 based on the unstable factor related to an internal operation of the memory device 3. Thus, the random number W2 having irreproducibility can easily be generated.

In the host device 2 according to the embodiment, the random number generating unit 34 generates the random number W2 based on the unstable factor, which is the elapsed time from the timing (T3, T8) of completion of transmitting the read command C (C1, C2) (request-data command) from the host device 2 to the memory device 3 to the timing (T5, T10) of start of receiving the data D (D1, D2) from the memory device 3 by the host device 2. The random number W2 is generated based on the elapsed time taking various values. Thus, the random number W2 having irreproducibility can easily be generated.

Furthermore, in the host device 2 according to the embodiment, the random number generating unit 34 generates the random number W2 based on the counter value of the clock K1 counted by the counter 82 (second counter) from the timing (T3, T8) of completion of transmitting the read command C (C1, C2) from the host device 2 to the memory device 3 to the timing (T5, T10) of start of receiving the data D (D1, D2) from the memory device 3 by the host device 2. The clock cycle of the clock K1 varies due to an ambient environment such as temperature and a voltage of a power source. The counter value of the counter 82 varies due to variation in the clock cycle of the clock K1. The random number W2 is generated based on the counter value. Thus, the random number W2 having irreproducibility can easily be generated.

In the host device 2 according to the embodiment, the clock generating unit 22 generates a spread spectrum clock as the clock K1. With this configuration, the clock cycle of the clock K1 can intentionally be varied. Thus, the random number W2 having irreproducibility can easily be generated by the random number generating unit 34.

In Embodiment 2, the random number generating unit 34 generates the random number W2 based on the time necessary for the processing of reading the data D from the memory core 44. However, as in the exemplary modification 1-1, the random number W2 may be generated based on a time necessary for processing of writing the data D in the memory core 44.

In Embodiment 2, the random number generating unit 34 generates the random number W1 based on the time necessary for the processing of reading the data D from the memory core 44. However, as in the exemplary modification 1-2, the random number W2 may be generated based on a time necessary for processing of deleting the particular data D stored in the memory core 44.

In Embodiment 2, the random number generating unit 34 generates the random number W2 based on the elapsed time from the completion of transmitting the read command C to the start of receiving the data D. However, as in the exemplary modification 1-3, the random number W2 may be generated based on a time necessary for accessing the memory core 44.

In Embodiment 2, the random number generating unit 34 generates the random number W2 based on the elapsed time from the completion of transmitting the read command C to the start of receiving the data D. However, as in the exemplary modification 1-4, the random number W2 may be generated based only on a time necessary for error correction processing.

Embodiments 1 and 2 may be combined to perform generating the random number W1 by the memory device 3 and the random number W2 by the host device 2 at the same time.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

While the invention has been described in detail, the foregoing description is in all aspects illustrative and not restrictive. It is understood that numerous other modifications and variations can be devised without departing from the scope of the invention.

What is claimed is:

1. An information processing device connected to an external device and comprising:
   circuitry configured to:
   store data in a storage,
   control an access to the storage by a controller,
   generate a random number based on a first unstable factor related to an access operation to the storage performed by the controller and a second unstable factor related to an access operation to the information processing device performed by the external device,
   generate a clock,
   count the generated clock, and
   generate the random number based on an elapsed time from a completion of booting the information processing device to a start of receiving a particular command from the external device by the information processing device,
   the elapsed time being
   based on a counter value of the clock from the completion of booting the information processing device to the start of receiving the particular command from the external device by the information processing device, the counter value being the second unstable factor.

2. The information processing device according to claim 1, wherein the circuitry is configured to generate the random number based on an elapsed time from a completion of receiving a read-data command given by the external device to a start of transmitting data from the information processing device to the external device, the elapsed time being the first unstable factor.

3. The information processing device according to claim 2, wherein the circuitry is configured to generate the random number based on a counter value of the clock from the completion of receiving the read-data command given by the external device to the start of transmitting the data from the information processing device to the external device, the counter value being the first unstable factor.

4. The information processing device according to claim 1, wherein the circuitry is configured to generate the random number based on an elapsed time from a completion of receiving a write-data command given by the external device to a completion of writing data in the storage, the elapsed time being the first unstable factor.

5. The information processing device according to claim 4, wherein the circuitry is configured to generate the random number based on a counter value of the clock from the completion of receiving the write-data command given by the external device to the completion of writing the data in the storage, the counter value being the first unstable factor.

6. The information processing device according to claim 1, wherein the circuitry is configured to generate the random number based on an elapsed time from a completion of receiving a delete-data command given by the external device to a completion of deleting data in the storage, the elapsed time being the first unstable factor.

7. The information processing device according to claim 6, wherein the circuitry is configured to generate the random number based on a counter value of the clock from the completion of receiving the delete-data command given by the external device to the completion of deleting the data in the storage, the counter value being the first unstable factor.

8. The information processing device according to claim 1, wherein the circuitry is configured to generate the random number based on an elapsed time from a start to a completion of reading data from the storage, the elapsed time being the first unstable factor.

9. The information processing device according to claim 8, wherein the circuitry is configured to generate the random number based on a counter value of the clock from the start to the completion of reading the data from the storage, the counter value being the first unstable factor.

10. The information processing device according to claim 1, wherein the circuitry is configured to correct an error of data read from the storage, and generate the random number based on an elapsed time from a start to a completion of error correction processing, the elapsed time being the first unstable factor.

11. The information processing device according to claim 10, wherein the circuitry is configured to generate the random number based on a counter value of the clock from the start to the completion of the error correction processing, the counter value being the first unstable factor.

12. An information processing device connected to an external device and comprising: circuitry configured to:
    generate a random number based on a first unstable factor related to an access operation to the external device performed by the information processing device and a second unstable factor related to an internal operation of the external device,
    generate a clock,
    count the generated clock, and
    generate the random number based on an elapsed time from a completion of booting the information processing device to a predetermined timing after a completion of the access operation to the external device performed by the information processing device,
    the elapsed time being
    based on a counter value of the clock from the completion of booting the information processing device to the predetermined timing after the completion of the access operation to the external device performed by the information processing device, the counter value being the first unstable factor.

13. The information processing device according to claim 12, wherein the circuitry is configured to generate the random number based on an elapsed time from a completion of transmitting a request-data command to the external device from the information processing device to a start of receiving data from the external device by the information processing device, the elapsed time being the second unstable factor.

14. The information processing device according to claim 13, wherein the circuitry is configured to generate the random number based on a counter value of the clock from the completion of transmitting the request-data command to the external device from the information processing device to the start of receiving the data from the external device by the information processing device, the counter value being the second unstable factor.

15. A random number generating method performed by an information processing device connected to an external device and including circuitry configured to store data in a storage and control an access to the storage by a controller, the random number generating method comprising:
- generating a random number based on a first unstable factor related to an access operation to the storage performed by the controller and a second unstable factor related to an access operation to the information processing device performed by the external device,
- generating a clock,
- counting the generated clock, and
- generating the random number based on an elapsed time from a completion of booting the information processing device to a start of receiving a particular command from the external device by the information processing device, the elapsed time being
- based on a counter value of the clock from the completion of booting the information processing device to the start of receiving the particular command from the external device by the information processing device, the counter value being the second unstable factor.

16. A random number generating method performed by an information processing device connected to an external device, the random number generating method comprising:
- generating a random number based on a first unstable factor related to an access operation to the external device performed by the information processing device and a second unstable factor related to an internal operation of the external device,
- generating a clock,
- counting the generated clock, and
- generating the random number based on an elapsed time from a completion of booting the information processing device to a predetermined timing after a completion of the access operation to the external device performed by the information processing device, the elapsed time being
- based on a counter value of the clock from the completion of booting the information processing device to the predetermined timing after the completion of the access operation to the external device performed by the information processing device, the counter value being the first unstable factor.

* * * * *